United States Patent Office 2,868,039
Patented Jan. 13, 1959

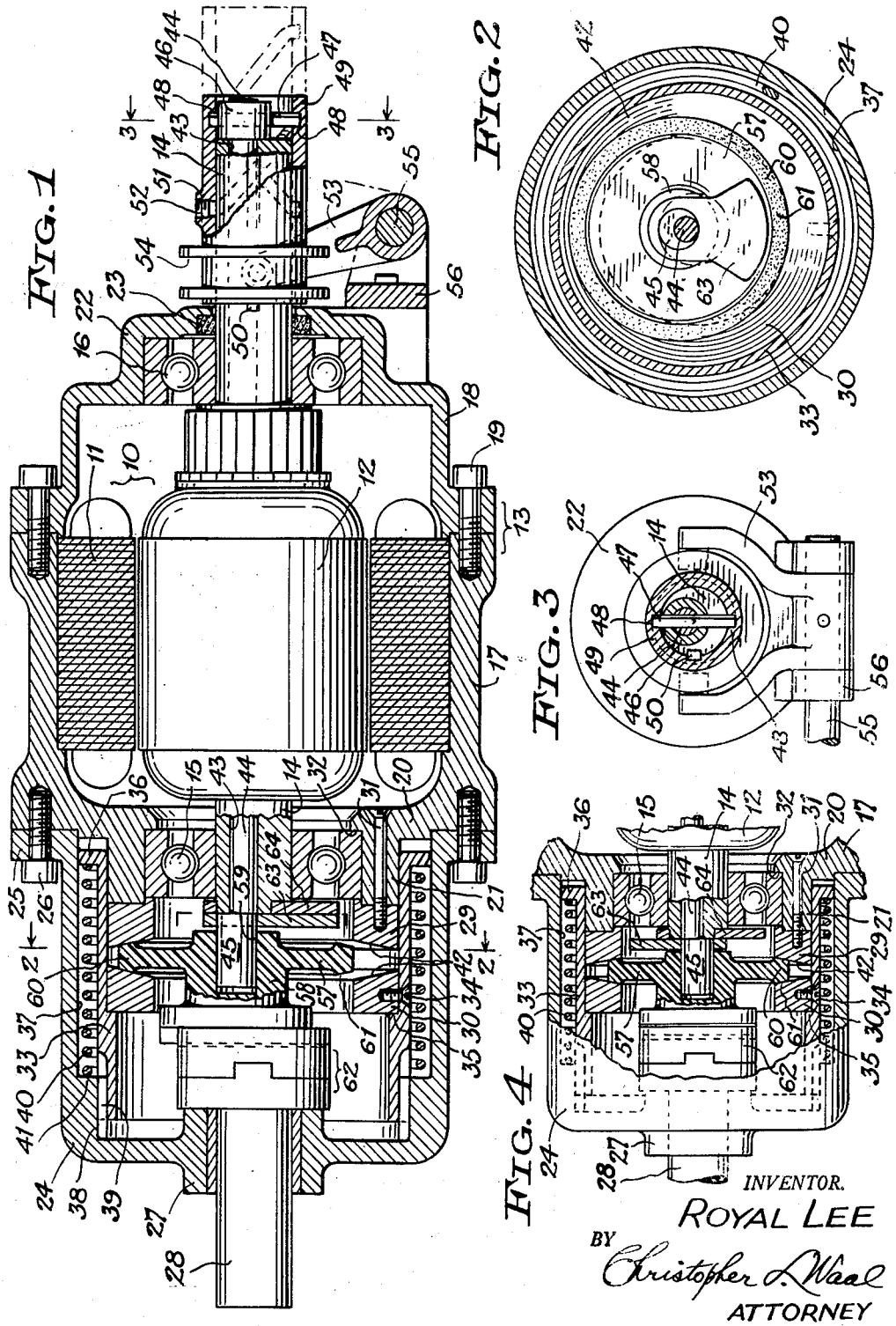

2,868,039

VARIABLE SPEED TRANSMISSIONS

Royal Lee, Elm Grove, Wis.

Application January 3, 1956, Serial No. 556,989

6 Claims. (Cl. 74—798)

The present invention relates to speed-changing transmissions and more particularly to those of the friction drive type.

An object of the invention is to provide an improved and efficient friction drive transmission which is of simple, compact and inexpensive construction and which will afford a relatively large speed reduction.

Another object is to provide a friction drive transmission having an infinitely variable speed ratio and in which the speed ratio can readily be changed during the operation of the transmission.

Still another object is to provide a variable speed transmission of this type in which a rotatable driven member thereof can be adjusted to zero speed regardless of the speed of the driving member.

A further object is to provide a variable speed transmission including improved balancing means for the rotating parts.

A still further object is to perfect details of construction generally.

The invention further consists in the several features hereinafter described and claimed.

In the accompanying drawing,

Fig. 1 is a longitudinal sectional elevation of a variable speed transmission constructed in accordance with the invention, the transmission being adjusted to produce maximum speed of an output shaft thereof, and a shifted position of a drive-ratio adjuster being shown in broken lines;

Fig. 2 is a transverse sectional elevation taken generally on the line 2—2 of Fig. 1;

Fig. 3 is a transverse sectional view taken generally on the line 3—3 of Fig. 1; and Fig. 4 is a fragmentary longitudinal sectional elevation generally similar to Fig. 1 but showing the transmission adjusted to produce zero speed of the output shaft.

In the drawing, 10 designates an electric motor of any suitable type, such as a variable speed series motor, or an induction motor. The motor, which in some cases may be reversible, includes a stator 11 and a rotor 12, the stator being mounted in a frame or casing 13, and the rotor having a shaft 14 which is journalled in the casing, as by ball bearings 15 and 16. The motor frame or casing 13 is here shown to comprise a pair of complementary cup-shaped casing members 17 and 18 secured together, as by screws 19. The casing member 17 has an annular end wall 20 with a hollow cylindrical hub 21 in which the ball bearing 15 is confined, and the casing member 18 has a hub portion 22 receiving therein the ball bearing 16 and an oil seal 23. The motor shaft 14 forms the input or driving shaft of the transmission, as hereinafter described.

A cup-shaped housing 24 projects axially from an end of the motor casing 13 and has an annular rim flange 25 secured to the hubbed end of the casing member 17, as by screws 26. The outer end wall of the housing 24 has a hub 27 in which is journalled an output or driven shaft 28 coaxial with the motor shaft 14.

The speed-changing transmission of the invention includes axially spaced companion track rings 29 and 30 which are mounted within the housing 24 in coaxial relation to the motor shaft. These track rings are confined against rotation, but are capable of relative axial displacement, as hereinafter described. The track ring 29 is rigidly secured to the end face of the casing member hub 21, as by screws 31, and forms a retainer for the ball bearing 15, the outer race of this bearing being axially confined between the track ring and an annular shoulder 32 in the annular end wall 20 of the motor casing. The track ring 30 is mounted in a slidable sleeve 33 extending coaxially in the cup-shaped housing 24. This track ring is rigidly secured in the sleeve, as by screws 34 and abuts against an annular shoulder 35 formed in the sleeve. At its inner end the sleeve 33 has an out-turned annular flange 36 slidable in a cylindrical guide bore 37 formed in the housing 24. In addition thereto, or as an alternative support, the inner end of the sleeve may slide on the track ring 29, or on the cylindrical hub 21 of the motor casing. The outer end portion of the sleeve 33 is slidable in a guide bore 38 formed in the housing 24 and has a splined connection 39 with this bore so as to prevent rotation of the sleeve. The sleeve-carried track ring 30 is spring-urged toward the companion track ring 29 by a coiled spring 40 surrounding the slidable sleeve, one end of the spring bearing against an annular shoulder 41 in the housing, and the other end of the spring bearing against the sleeve flange 36. The track rings 29 and 30, which are preferably formed of hardened steel, have outwardly converging confronting faces 42 of frusto-conical shape, the included angle between these faces being relatively small, for example, 20 to 30 degrees.

The motor shaft 14 has formed longitudinally therethrough an eccentric bore 43 in which is rotatably mounted a cylindrical stem or shaft 44 carrying an eccentric cylindrical head or crankpin 45 at the housing end of the motor, the stem being angularly adjustable through 180°. In one position of the stem the head or crank-pin 45 is coaxial with the shaft, as seen in Fig. 4, and in the other position of the stem the head or crank-pin has a maximum throw which is double the eccentricity of the stem, as seen in Fig. 1. By way of example, in the case of a small motor-driven mechanism, the eccentricity of the stem may be about 1/16 inch, in which event the maximum throw of the crank-pin is 1/8 inch.

The opposite end of the stem 44 projects from the motor shaft and is provided with a collar 46 which confines the stem against axial displacement. The stem is retained in angularly adjusted position according to the crank throw desired. A cross pin 47 slidably extends through the stem and collar, and the opposite ends of the cross pin slidably fit in helicoidal cam grooves 48 formed in a reciprocable sleeve 49 which is slidable on the motor shaft, the sleeve having a splined connection 50 with this shaft. In some instances one of these cam grooves may be omitted. At any suitable point along one of the cam grooves the sleeve has an opening 51 for admitting the cross pin, the opening being normally closed by a screw plug 52. The sleeve 49 is axially shiftable on the motor shaft, as by a fork 53 engaging in an annular channel 54 formed in the sleeve. The fork is here shown to be swingable on a rock-shaft 55 journalled in a bracket 56 secured to the motor casing member 13. The rock-shaft may be either manually or automatically actuated according to motor speed, load, or other conditions, or to produce a desired speed of the driven shaft.

The variable-throw crank-pin 45 on the motor shaft forms a bearing on which a planet or friction wheel 57 is rotatably mounted to turn on an axis parallel to the motor shaft axis, the wheel having a hub 58 with an axial bore 59 in which the crank-pin slidably fits. The planet wheel has a thickened rim portion 60 which is interposed between the track rings 29 and 30 in a wedging, frictional, rolling engagement therewith, the rim portion having outwardly converging frusto-conical friction side faces 61 of the same inclination as the side faces 42 of the track rings. The planet wheel is preferably formed of a non-metallic material such as flock-filled Bakelite.

The planet wheel 57 and the output or driven shaft 28 are drivingly connected by a suitable flexible coupling 62, here shown to be an Oldham coupling, the planet wheel hub forming one element of the coupling.

In some instances, balancing means are provided for the rotating parts. The variable-throw crank-pin 45 carries a balancing or counterweight arm 63, and the motor shaft 14 carries a generally similar arm 64. When the crank-pin is in its maximum throw position, both counterweight arms are disposed in laterally adjacent relation at the same side of the motor shaft remote from the crank-pin, as seen in Fig. 1, and when the crank-pin is in its central or zero-throw position, the counterweight arms extend in opposite directions, as seen in Fig. 4.

The parts of the transmission mechanism are so proportioned as to obtain the desired range of speed ratios. By way of example, the output shaft may have a maximum speed about one-tenth the speed of the motor shaft.

In operation, with the crank-pin 45 set coaxially of the motor shaft to its zero-throw position, as seen in Fig. 4, the planet wheel 57 is also coaxial with the motor shaft, and remains stationary when the motor is running. The crank-pin then rotates idly in the axial bore 59 of the planet wheel, and the wheel is held against rotation by the track rings 29 and 30 frictionally engaging the wheel rim 60 along annular zones of contact under the pressure of the coiled spring 40. When the crank-pin 45 is shifted to an eccentric position by actuating the shifting fork 53, the planet wheel is correspondingly shifted in a radial direction and wedges apart the track rings against the pressure of the coiled spring 40. During this radial shift of the planet wheel, the wheel also slides axially a short distance along the crank-pin. The frictional contact between the planet wheel rim and the track rings is now limited to a narrow radial strip or region, the rest of the wheel rim being free of the track rings. During the rotation of the motor shaft, the planet wheel rolls on the frustoconical surfaces 42 of the stationary track rings and has an orbital travel at the same speed as the motor shaft and in the same direction. However, the speed of rotation of the planet wheel about its own axis is much lower than the motor speed and in the opposite direction, so that the output shaft 28 is rotated by the planet wheel at a low rate of speed and in a direction opposite to that of the motor shaft. When the eccentricity or throw of the crank-pin 45 is increased, the speed of the output shaft is correspondingly increased, the maximum speed being obtained when the crank-pin is angularly shifted 180° from its coaxial position with respect to the motor shaft.

The speed of the output shaft can be infinitely varied between zero speed and a maximum speed which is a selected fraction of the speed of the motor, for example, about one-tenth of the motor speed.

Any wear which may occur at the rim portion of the planet wheel will be taken up by the spring 40 acting on the axially shiftable track ring 30.

I claim:

1. In a power transmission, a driving shaft, a planet wheel carrier rotatably supported by said shaft to turn on an axis eccentric to said shaft, said carrier having a bearing eccentric to the axis of said carrier, a planet wheel rotatably carried on said bearing, circular track means coaxial with said shaft and extending about said planet wheel, said planet wheel having a rolling frictional engagement with said track means, said carrier being angularly adjustable about its axis to vary the effective radius of said bearing with respect to the driving shaft axis to thereby vary the speed ratio of the transmission, and a driven shaft coupled to said planet wheel.

2. In a power transmission, a driving shaft, a planet wheel carrier rotatably supported by said shaft on an axis eccentric to said shaft, said carrier having a bearing eccentric to the axis of said carrier, a planet wheel rotatably carried on said bearing, circular track means coaxial with said shaft and extending about said planet wheel, said planet wheel having a rolling frictional engagement with said track means, said carrier being angularly adjustable about its axis to vary the effective radius of said bearing with respect to the driving shaft axis to thereby vary the speed ratio of the transmission, a driven shaft coupled to said planet wheel, a first balancing weight fixedly carried by said driving shaft adjacent to said planet wheel, a second balancing weight fixedly carried by said planet wheel carrier and extending to the side thereof remote from said eccentric bearing, said weights being in laterally adjacent additive relation when said bearing is adjusted to its maximum throw position, and said weights extending in opposite directions when said bearing is adjusted to its minimum throw position.

3. In a power transmission, a driving shaft, a stem eccentrically mounted in said shaft to turn on an axis parallel to the shaft axis and having a wheel-supporting bearing at one end of said shaft, said bearing being eccentric to said stem, means for angularly shifting said stem with respect to said shaft to vary the throw of said bearing with respect to said shaft, said bearing in one position being coaxial with said shaft, a planet wheel rotatably carried by said bearing, circular track means coaxial with said shaft and extending about said planet wheel, said planet wheel being disposed in frictional rolling engagement with said track means, and a driven shaft coupled to said planet wheel.

4. In a power transmission, a driving shaft, a stem eccentrically mounted in said shaft to turn on an axis parallel to the shaft axis and having a wheel-supporting bearing at one end of said shaft, said bearing being eccentric to said stem, means including an axially shiftable cam sleeve at the other end of said shaft for angularly shifting said stem with respect to said shaft to vary the throw of said bearing with respect to said shaft, said bearing in one position being coaxial with said shaft, a planet wheel rotatably carried by said bearing, circular track means coaxial with said shaft and extending about said planet wheel, said planet wheel being disposed in frictional rolling engagement with said track means, and a driven shaft coupled to said planet wheel.

5. In a power transmission, a support having a bore an anti-friction bearing having an outer race fitting in said bore, a driving shaft journalled in said bearing, a wheel bearing eccentrically carried by said shaft, a planet wheel rotatable on said wheel bearing, annular track means disposed about said wheel in coaxial relation to said shaft and including a track ring forming a retainer for said bearing race, said planet wheel having a frictional rolling engagement with said track means, and a driven shaft coupled to said planet wheel.

6. In a power transmission, a driving shaft, a planet wheel rotatably carried by said shaft eccentrically of said shaft, a pair of track rings coaxial with said shaft and extending about said planet wheel, said track rings being laterally spaced and relatively axially shiftable, a slidably mounted supporting sleeve carrying one of said track rings and disposed coaxially thereof, spring means acting on said sleeve for urging the track ring carried by said sleeve toward the other track ring, said track rings having confronting outwardly converging friction faces, said planet wheel having a rim portion interposed between said track rings in rolling frictional engagement with said friction faces, and a driven shaft coupled to said planet wheel.

References Cited in the file of this patent

UNITED STATES PATENTS

| | | |
|---|---|---|
| 1,015,808 | Landis | Jan. 30, 1912 |
| 1,995,333 | Svenson | Mar. 26, 1935 |
| 2,035,582 | Winger | Mar. 31, 1936 |
| 2,223,711 | Winger | Dec. 3, 1940 |
| 2,387,401 | Marco | Oct. 23, 1945 |
| 2,445,710 | Dodge | July 20, 1948 |
| 2,455,842 | Weigel | Dec. 7, 1948 |